Patented Jan. 10, 1933

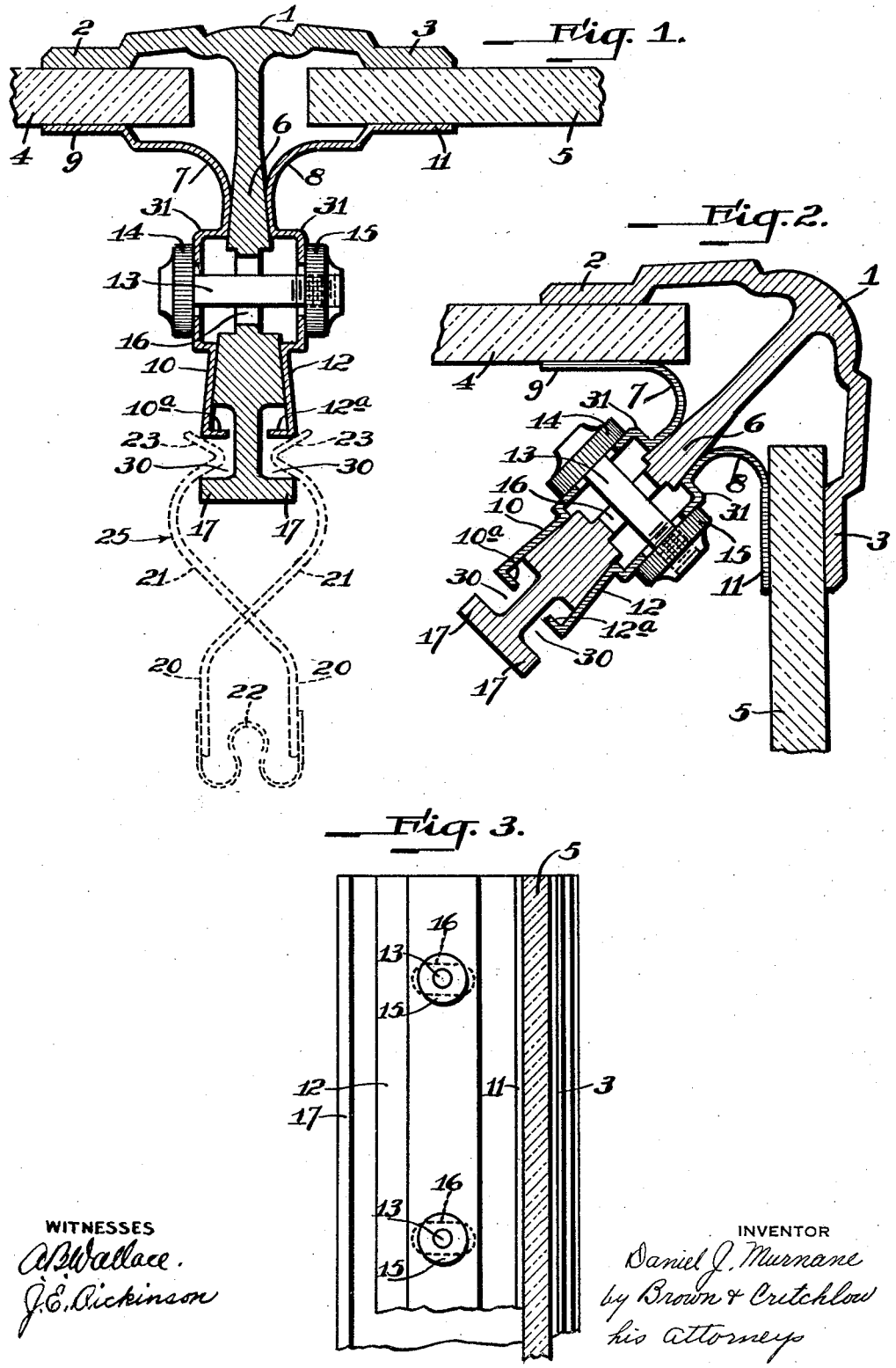

1,893,713

UNITED STATES PATENT OFFICE

DANIEL J. MURNANE, OF BURBANK, CALIFORNIA, ASSIGNOR TO NON PRESSURE GLAZING COMPANY, OF BURBANK, CALIFORNIA, A CORPORATION OF CALIFORNIA

PLATE GLASS HOLDING BAR

Application filed July 16, 1930  Serial No. 468,295.

The invention relates to bar structures for holding the adjacent edges of two plates of glass in store fronts and the like, either at corners or where both plates lie in the same plane.

Considerable difficulty has been encountered in the use of bar structures of the nature contemplated by this invention as heretofore practiced because they afford the edges of the plates engaged by them insufficient lateral support and also because they depend upon screws or like members for holding them in assembled operative positions and these usually exert localized pressure upon the plates to such an extent and in such a way as to cause a substantial amount of breakage. In fact, the breakage which can be accounted for by this reason, that is localized screw pressure alone, is so large that it materially increases the insurance rates of such structures.

Another serious fault present in the prior bar structures of the type herein contemplated is their lack of capacity to permit them to be properly and readily adjusted to receive plates of glass of different thicknesses, it being understood that, due to exigencies of their manufacture, plates of glass intended to be identical frequently vary as much as an eighth of an inch in thickness.

An object of this invention is to provide a plate glass holding device which may be economically manufactured and easily assembled, and which is constructed to uniformly engage the edges of the plates of glass along their entire length.

A further object is to provide a plate glass holding bar characterized in the manner just stated, which is so constructed that it not only makes uniform engagement with the entire adjacent edges of the plates of glass which it embraces, but does so regardless of variations in the thicknesses of the plates, and in addition also reinforces the adjoining edges of the glass against lateral displacement such as is caused by vibration, wind forces and the like.

The invention is illustrated in the accompanying drawing, of which Fig. 1 is a horizontal cross sectional view to enlarged scale of a bar structure for holding the adjacent edges of two plates of glass which lie in the same plane; Fig. 2 is a similar view of a corner bar structure; and Fig. 3 is an elevation of a portion of the structure shown in Fig. 1.

The plate glass holder or bar structure provided according to this invention comprises a T section 1, the outer plate or flange portion of which forms a pair of lateral clamping flanges 2 and 3 that are employed to engage the outer faces of the adjacent plates of glass 4 and 5, which it joins together, and which, as shown in Fig. 1, lie in a single vertical plane. The stem portion 6 of the section, which is integral with the flanges 2 and 3, is adapted to extend inwardly between the adjacent edges of the plates 4 and 5. Cooperating with the outer clamping flanges there are a pair of angular inner clamps 7 and 8, inner clamp 7 having a laterally-extending leg 9 for engaging the inner face of plate 4 and an inwardly-extending leg 10 resting upon a face of stem 6, and clamp 8 similarly having a laterally-extending leg 11 and an inwardly-extending leg 12 corresponding in form and function with legs 9 and 10.

In order to hold the inner clamps in place, means are provided for clamping legs 10 and 12 to the side faces of stem 6, such means preferably consisting of screws 13 provided with knurled heads 14 and with knurled thumb nuts 15, the screws extending through openings provided in legs 10 and 12 and through horizontally disposed slots 16 provided in stem 6 and spaced from each other uniformly along the length of the section. The slots 16 are made sufficiently long to permit the necessary sliding adjustment of the inner clamps to accommodate different thickness of glass.

For evenly engaging the head of the screws and the face of the nuts a flat faced raised or boss portion 31 is formed on the legs 10 and 12. The stem 6 of the T section, which is engaged by the outwardly-extending legs 10 and 12 of the inner clamps, is preferably made with inwardly tapering walls giving it a wedge-shape. This not only assists in moving the inner clamps into engagement with the plates, but also effectively aids in preventing the cooperating clamping members from separating due to the vibrations which window fronts and like structures are normally subjected to in service. Adjacent the free end of stem 6 on opposite sides of the stem there are formed lengthwise extending grooves 30 which provide shoulders 17 disposed beyond the ends of legs 10 and 12 of the clamps 7 and 8 when in place, and which are utilized for aiding in moving the clamps 7 and 8 into engagement with the plates of glass, as will clearly appear hereinafter. For also assisting in this and in the assembly of the inner clamps the edges of the legs 10 and 12 are turned inwardly at 10a and 12a.

In making an installation of the bar structure, outer clamp 1 is placed in the position shown in Fig. 1 with its flanges 2 and 3 bearing against the outer faces of plates 4 and 5, and its central stem 6 extending between the adjacent edges of such plates. Inner clamps 7 and 8 are then assembled with their inwardly-extending legs 10 and 12 adjacent to the faces of stem 6 and their outwardly-extending legs 9 and 11 adjacent to the inner faces of the plates of glass. To assist in moving legs 9 and 11 into engagement with plates 4 and 5 after the screws 13 have been inserted, but before their nuts 15 have been tightened, the stem 6 is preferably provided on its free end with shoulders 17 between which and the inner ends of legs 10 and 12 a wedging tool may be inserted to urge the inner clamps against the glass. While the invention is not limited to the use of any particular tool for performing the function referred to, a suitable tool 25, such as indicated in dotted lines in Fig. 1, may be utilized for this purpose. As illustrated, the tool comprises a pair of arms 20 having inversely curved, slidably arranged inner jaw-like engaging ends 21 and yieldably disposed outer ends to which a suitable spring 22 is attached for yieldingly urging the inner ends towards each other. The inner ends 21 of these two arms are provided with wedge-shaped heads 23 which, when the clamp is applied in the position shown, engage the outer ends of legs 10 and 12 of the clamps 7 and 8 and the shoulders 17 of stem 6 causing the clamps to move inwardly so that their laterally-extending legs 9 and 11 properly and uniformly bear upon plates 4 and 5. Before tightening nuts 15 upon screws 13, a suitable number of tools 25 are applied at intervals such as from two to five feet apart, so that throughout the entire length of the glass the inner clamping members are properly positioned, it being understood that this spacing will vary with the height of the glass. Inner clamps 7 and 8 being formed of metal having suitable resiliency, their legs 9 and 11 are thus caused to uniformly engage the plates of glass regardless of variations in the thicknesses of the plates, and to not produce any deleterious or localized pressure on the glass at any point.

As will be appreciated by those skilled in the art, the T section employed in this invention not only forms a simple, sturdy and easily manufactured clamping section, but also by reason of its sturdy stem and the attachment thereto of the inner clamps 7 and 8 forms a strong bracing member for overcoming bending and vibration of the plates at their edges which is normally produced by wind and other forces such as are encountered in service.

From the foregoing explanation of the bar structure shown in Figs. 1 and 3, the construction of the corner bar shown in Fig. 2 is apparent. In fact, the corner bar is the same as that shown in Figs. 1 and 3 with the exception that the lateral flanges 2 and 3 of the T section 1 are disposed at right angles to each other, instead of in line, and the laterally extending legs 9 and 11 of inner clamps 7 and 8 are correspondingly disposed at right angles to each other. Manifestly the angles between these flanges and legs may be varied, depending upon the various requirements of different corner installations. The corner bar structure shown in Fig. 2 being substantially the same as that of Figs. 1 and 3, its several parts are designated by the same numerals, and require no further explanation.

The advantages of the bar structure provided according to this invention are apparent from the foregoing description of it. Specifically, it is so formed that the edges of plates of glass are firmly held in place by it through the uniform engagement therewith along the entire joining edges of the glass, and are also firmly reinforced against lateral displacement by reason of the lateral bracing strength of the bar. Also, the structure is simple in form and easy to assemble. Furthermore, the inner and outer clamping members of the structure may be economically manufactured. Outer clamp 1 may be extruded from metal with the lateral flanges of such exterior contour as to enhance the appearance of the structure, while the inner clamp 7 may be formed from rolled metal plates. Although the entire structure may be made of any suitable metal, it preferably is formed of aluminum.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. A plate-glass holder comprising an outer clamp having lateral flanges for engaging the outer faces of adjacent plates of glass and having a central wedge-shaped segment provided with slots for receiving retaining members and adapted to extend inwardly between the edges of such plates, a pair of angular inner clamps each having a laterally-extending leg for engaging the inner face of one of such plates and an inwardly-extending leg resting upon a face of said segment, and retaining members extending through said inwardly-extending legs and through said slots for clamping said inwardly-extending legs upon said segment.

2. A plate-glass holder comprising an outer clamp having lateral flanges for engaging the outer faces of adjacent plates of glass and having a central segment adapted to extend inwardly between the edges of such plates and provided at its inner edge with outwardly-extending shoulders, a pair of angular inner clamps each having a laterally-extending leg for engaging the inner face of one of such plates and an inwardly-extending leg resting upon a face of said segment, the inner edges of said inwardly-extending legs forming with said shoulders pockets for the reception of a tool for pressing said clamps yieldingly against the inner faces of plates of glass, and means for clamping said inwardly-extending legs upon said segment.

3. A plate-glass holder comprising an outer clamp having lateral flanges for engaging the outer faces of adjacent plates of glass and a wedge-shaped segment integral therewith provided with slots for receiving retaining members and adapted to extended inwardly between the edges of such plates, said segment being provided at its inner edge with outwardly-extending shoulders, a pair of angular inner clamps each having a laterally-extending leg for engaging the inner face of one of such plates and an inwardly-extending leg resting upon a face of said segment, the inner edges of said inwardly-extending legs forming with said shoulders pockets for the reception of a tool for pressing said clamps yieldingly against the inner faces of plates of glass, and retaining members extending through said inwardly-extending legs and through said slots for clamping said inwardly-extending legs upon said segment.

4. A plate-glass holder comprising an outer clamp having lateral flanges for engaging the outer faces of adjacent plates of glass and a wedge-shaped segment integral therewith and adapted to extend inwardly between the edges of such plates, said segment being provided at its inner edge with outwardly-extending shoulders, a pair of angular inner clamps each having a laterally-extending leg for engaging the inner face of one of such plates and an inwardly-extending leg resting upon a face of said segment, the inner edges of said inwardly-extending legs forming with said shoulders pockets for the reception of a tool for pressing said clamps yieldingly against the inner face of plates of glass, and means for clamping said inwardly-extending legs upon said segment.

5. A plate-glass holder comprising an outer clamp having lateral flanges for engaging the outer faces of adjacent plates of glass and a wedge-shaped segment integral therewith provided with slots for receiving retaining members and adapted to extend inwardly between the edges of such plates, a pair of angular inner clamps each having a laterally-extending leg for engaging the inner face of one of such plates and an inwardly-extending leg resting upon a face of said segment, and retaining members extending through said inwardly-extending legs and through said slots for clamping said inwardly-extending legs upon said segment, said inwardly-extending inner clamp legs being provided with flat faced raised or boss portions for engaging the ends of said retaining members.

6. A plate holder comprising an outer clamping member for engaging the outer surfaces of adjacent plates of glass and having a central segment adapted to extend inwardly between the edges of such plates, a pair of angular inner clamps each having a laterally extending leg adapted to engage the inner surface of one of such plates and an inwardly extending leg adapted to engage one side of the inwardly extending segment of said outer clamping member, cooperating means on said inner and outer clamping members for the reception of a tool for pressing said clamping members into engagement with the opposite surfaces of the plates of glass, and means for rigidly securing said clamping members together in such a manner as to not disturb a preselected pressure relationship established between them and the surfaces of the glass.

7. A plate glass holder comprising outer and inner clomping members adapted to engage over the length thereof the opposite surfaces adjoining the edges of two abutting plates of glass, cooperating means on the clamping members for the reception of a tool for pressing them into engagement with the opposite surfaces of the glass, and means for fixedly binding said clamping members together in such a manner as to accurately and rigidly maintain them in a preselected pressure relationship with the surfaces of the glass established by the pressing tool.

In testimony whereof, I sign my name.

DANIEL J. MURNANE.